United States Patent [19]

Harada et al.

[11] Patent Number: 4,871,259

[45] Date of Patent: Oct. 3, 1989

[54] RUBBER-LIKE MATERIAL KNEADING APPARATUS

[75] Inventors: Jumei Harada; Kazuhisa Nishigai, both of Tokyo, Japan

[73] Assignee: Bridgestone Corporation, Tokyo, Japan

[21] Appl. No.: 319,825

[22] Filed: Mar. 3, 1989

Related U.S. Application Data

[63] Continuation of Ser. No. 84,231, Aug. 11, 1987, abandoned.

[30] Foreign Application Priority Data

Aug. 13, 1986 [JP] Japan ................... 61-190293

[51] Int. Cl.$^4$ ............... B01F 7/08; B29B 7/20
[52] U.S. Cl. ................... 366/85; 366/300; 366/301; 425/209
[58] Field of Search ............ 366/83, 84, 86, 85, 366/293, 297, 300, 301, 298, 299, 96, 97, 91, 318, 319; 425/204, 207–209

[56] References Cited

U.S. PATENT DOCUMENTS

| 3,239,878 | 3/1966 | Ahlefeld, Jr. et al. | 366/84 |
| 3,403,894 | 10/1968 | Matsuoka et al. | 366/299 |
| 3,565,403 | 2/1971 | Matsuoka | 366/84 |
| 4,332,481 | 6/1982 | Inoue et al. | 366/84 |

Primary Examiner—Harvey C. Hornsby
Assistant Examiner—Joseph S. Machuga
Attorney, Agent, or Firm—Sughrue, Mion, Zinn, Macpeak & Seas

[57] ABSTRACT

In a rubber-like material kneading apparatus having a pair of rotors with radially outwardly extended long vanes in a chamber, each of the rotors has at least three long vanes which are arranged around a rotary shaft at equal angular intervals in such a manner that the cutting angle formed by the rear surfaces of the long vanes and the tangential lines at the outermost ends of the long vanes is larger than 40°, whereby the rubber-like material can be kneaded with high efficiency.

2 Claims, 2 Drawing Sheets

RUBBER-LIKE MATERIAL KNEADING APPARATUS

This is a continuation, of application Ser. No. 07/084,231, filed 8/11/87, now abandoned.

BACKGROUND OF THE INVENTION

This invention relates to an apparatus for kneading rubber-like material in a chamber with rotors.

In general, rubber for manufacturing wheel tires is put in the chamber of such a kneading apparatus together with chemicals such as for instance carbon, and kneaded with a pair of rotors, so that the plasticity is decreased while the chemicals are uniformly dispersed.

A conventional rubber-like material kneading apparatus of this type comprises: a case having a chamber which is substantially cocoon-shaped in section; and a pair of rotors laid horizontally in the chamber, each rotor having two long vanes which are arranged at equal angular intervals and extended radially outwardly. Rubber blocks and chemicals in the chamber are kneaded by rotating the rotors in such a manner that the long vanes of one of the rotors are engaged with those of the other.

However, the conventional apparatus is disadvantageous in that it takes a relatively long time to uniformly disperse the chemical.

For the purpose of eliminating the difficulty, a four-vane type rotor has been proposed in which short vanes are extended from the long vanes, respectively, in such a manner that they are sloped in a direction opposite to that of the long vanes. However, even with a kneading apparatus with the four-vane type rotors, the kneading time cannot be shortened as expected; that is, it still takes a relatively long period of time to accomplish the kneading operation. If the kneading operation is continuously carried out for a long time, then the temperature of the rubber being kneaded rises, as a result of which the rubber is changed in quality for instance by vulcanization reaction Accordingly, heretofore when the temperature of the rubber increases to a predetermined value, the rubber is taken out of the chamber and cooled down. The rubber thus treated is kneaded again. Thus, the conventional kneading apparatus suffers from a difficulty that the kneading operation is low in efficiency.

SUMMARY OF THE INVENTION

Accordingly, an object of this invention is to provide a rubber-like material kneading apparatus in which the above-described difficulty accompanying a conventional rubber-like material kneading apparatus has been eliminated.

The foregoing object and other objects of the invention have been achieved by the provision of a rubber-like material kneading apparatus comprising a case having a chamber cocoon-shaped in section, and a pair of rotors built in the chamber which have radially extended long vanes, the rotors are rotated in such a manner that the long vanes of one of the rotors are engaged with those of the other, thereby to knead rubber-like material in the chamber; in which, according to the invention, at least three long vanes are provided for each of the rotors in such a manner that the long vanes are arranged at equal angular intervals, and that a cutting angle formed by the rear surfaces, in the direction of rotation, of the long vanes and the tangential lines at the outer ends, in radial direction, of the long vanes is larger than forty degrees.

This invention is based on the following finding through extensive research conducted by the the inventor: The rubber-like material in the chamber of the kneading apparatus, being strongly sheared by the long vanes with the aid of the inner surface of the chamber, is fluidly kneaded. However, as shown in FIG. 4, the region A where the rubber-like material is fluidly kneaded is only for a certain distance L measured, in the direction of rotation, from the front surface of each of the long vanes, and the rubber-like material in the region B located ahead of is scarcely kneaded, and is merely moved while being pushed by the rubber-like material in the region A.

In the apparatus of the invention, each of the rotors has at least three long vanes arranged around a rotary shaft at equal angular intervals. This is due to the following reason: As the number of long vanes is increased, the circumferential distance between adjacent long vanes is decreased. Since the region where the rubber-like material is fluidly kneaded by a long vane is predetermined in range as was described above, as the circumferential distance between adjacent long vanes is decreased, the ratio in volume of the rubber-like material which is fluidly kneaded to that which is merely moved is increased. Thus, as a whole, the quantity of rubber-like material fluidly kneaded is increased, and the chemicals are dispersed more uniformly.

On the other hand, as the number of long vanes is increased, the volume for receiving rubber-like material is decreased as much. This difficulty is eliminated by setting the cutting angle formed by the rear surfaces, in the direction of rotation, of the long vanes and the tangential lines at the outer ends of the long vanes to a value larger than forty degrees (40°).

The nature, principle and utility of the invention will become more apparent from the following detailed description when read in conjunction with the accompanying drawings.

DETAILED DESCRIPTION OF THE INVENTION

One preferred embodiment of this invention will be described with reference to the accompanying drawings.

Figure 1:
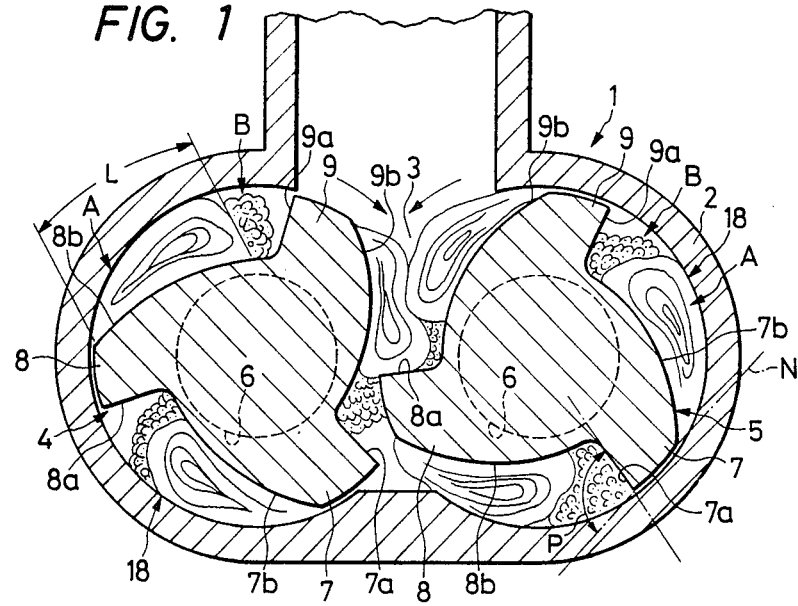
FIG. 1 is a sectional diagram outlining the arrangement of an example of a rubber-like material kneading apparatus according to this invention.
Figure 2:
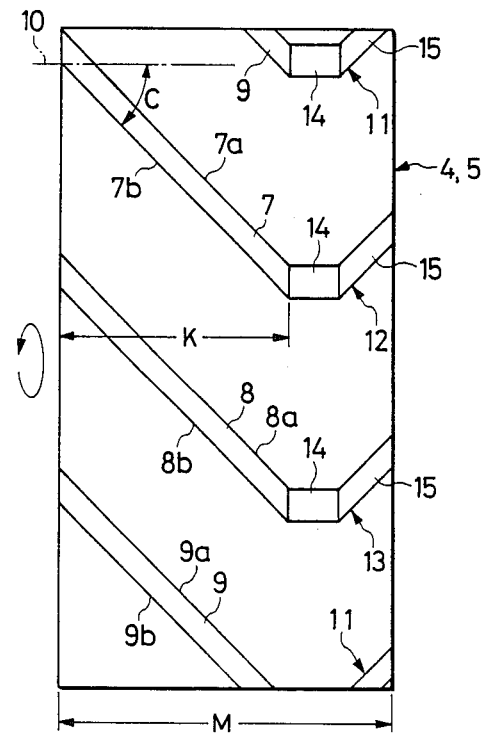
FIG. 2 is an unfolding diagram of a rotor in the apparatus shown in FIG. 1.

In FIGS. 1 and 2, reference character 1 designates a kneading apparatus which is generally called "a Banbury mixer". The kneading apparatus comprises a case 2 having a chamber 3 which is cocoon-shaped in section. A pair of horizontally extended rotors 4 and 5 are built in the chamber 3. Each of the rotors 4 and 5 is made up of a cylindrical shaft 6 and at least three long vanes 7, 8 and 9 (three long vanes in the embodiment) integral with the shaft 6. More specifically, in each of the rotors 4 and 5, the long vanes 7, 8 and 9 are extended radially from the shaft 6 and arranged around it at equal angular intervals. Furthermore, the long vanes 7, 8 and 9 are extended from one end to near the other end of the shaft 6 and form the same angle of torsion C of about 45° with respect to a plane 10 including the axis of rotation of the respective rotor (4 or 5). The term "a long vane" as used herein is intended to mean a vane whose axial length K is at least a half (½) of the axial length M of the rotor (4 or 5).

Where at least three vanes 7, 8 and 9 are provided for each of the rotors 4 and 5 as described above, the volume for receiving rubber 18 in the chamber 3 is reduced as much. This difficulty is eliminated by the following method: A cutting angle P formed by the rear surfaces 7a, 8a and 9a (in the direction of rotation) of the long vanes 7, 8 and 9 and the tangential lines N at the outer ends (in radial direction) of the long vanes 7, 8 and 9 is made larger than 40°, and the rear surfaces 7a, 8a and 9a are greatly gouged out. In this connection, the cutting angle P should be no more than 140°, because if it were larger than 140°, then the long vanes 7, 8 and 9 would be too small in wall thickness to be sufficient in mechanical strength.

On the other end portion (in the direction of axis) of each of the rotors 4 and 5, short vanes 11, 12 and 13 are formed in such a manner that they are connected to the long vanes 7, 8 and 9, respectively, and are extended radially outwardly from the shaft. These short vanes 11, 12 and 13 are smaller in height than the long vanes 7, 8 and 9. Each of the short vanes 11, 12 and 13 consists of a flat part 14 formed on one side in the axial direction, and sloped part 15 formed on the other side. The flat parts 14 are in parallel with the plane 10 mentioned above and merge with the long vanes 7, 8 and 9, respectively. The sloped parts 15 are opposite to the long vanes 7, 8 and 9 in the direction of inclination with respect to the plane 10, and merge with the flats 14.

The rotors 4 and 5 thus formed are turned in the directions of the arrows by a drive device (not shown) to knead the rubber 18 with the long vanes 7, 8 and 9 and the short vanes 11, 12 and 13 in the chamber 3.

The operation of the kneading apparatus thus constructed will be described:

With rubber blocks and chemicals such as sulfur and carbon placed in the chamber 3, the rotors 4 and 5 are rotated in the directions of the arrows so that the long vanes 7, 8 and 9 of one of the rotors 4 and 5 are engaged with those of the other. As a result, the rubber 18 is sufficiently kneaded, so that the plasticity of the rubber 18 is decreased while the chemicals are dispersed. In this operation, each of the rubber masses 18 caught by the front surfaces 7b, 8b and 9b (in the direction of rotation) of the long vanes can be divided into a region A where the rubber is fluidly kneaded by shearing and a region B where the rubber is merely moved by being pushed by the rubber 18 in the region A. The absolute quantity of rubber 18 in the region B is reduced by the following method. Since the distance L between the front surface of each of the long vanes and the front end of the region A is constant, at least three long vanes 7, 8 and 9 are formed around shaft of each of the rotors 4 and 5 at equal angular intervals so that the circumferential distances between whose vanes are decreased, whereby the region A where the rubber is fluidly kneaded is increased in volume ratio while the absolute quantity of rubber in the region where the rubber is merely carried is decreased. Therefore, the quantity of rubber kneaded fluidly is increased as a whole, and the chemicals are more uniformly dispersed while lowering of the plasticity is accelerated.

Figure 3:
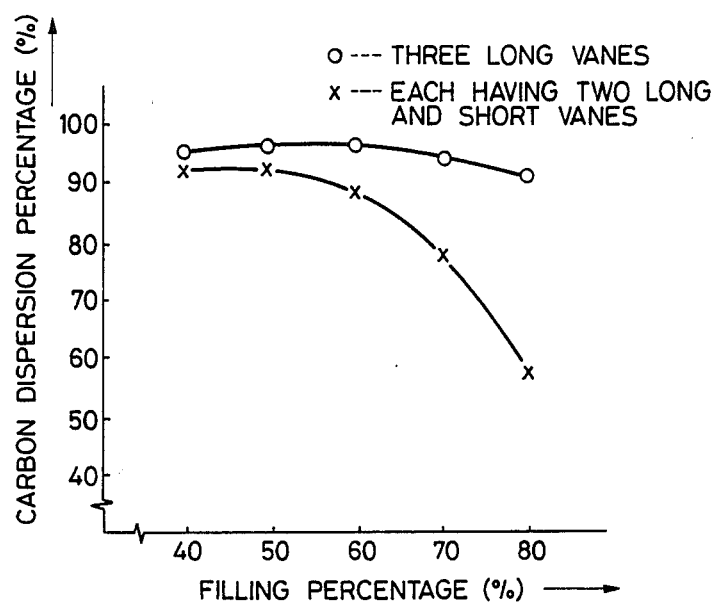
FIG. 3 is a graphical representation indicating rubber filling percentage with carbon dispersion percentage.
Figure 4:
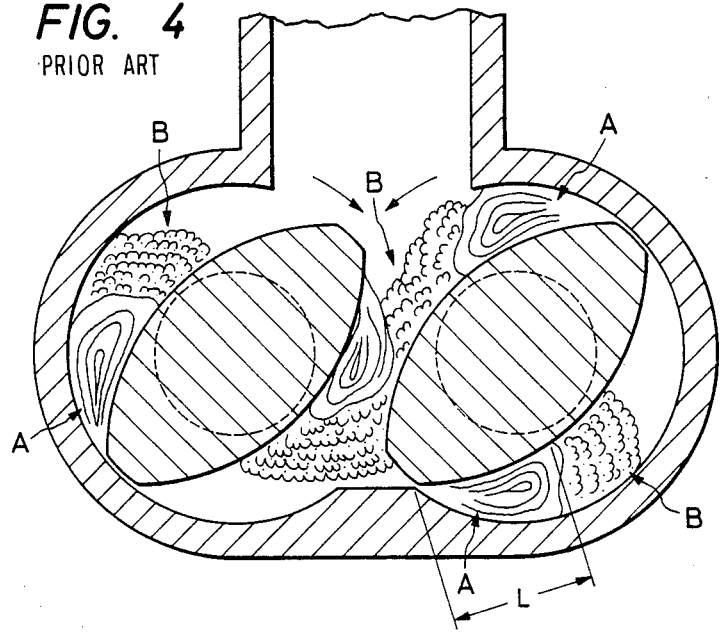
FIG. 4 is a sectional diagram outlining the arrangement of a conventional rubber-like material.

FIG. 3 is a graphical representation indicating percentage of filling the rubber 18 in the chamber 3 with carbon dispersion percentage in the rubber 18. As is apparent from FIG. 3, in the case where each rotor has three long vanes, even if the rubber filling percentage is increased, the carbon dispersion percentage is not so decreased. Thus, with the apparatus of the invention, the kneading operation can be satisfactorily carried out with the rubber filling percentage in a range of high values. This will permit a kneading operation with high efficiency. On the other hand, in the case of the conventional four-vane type rotors each having two long vanes and two short vanes, as the rubber filling percentage is made high, the carbon dispersion percentage is abruptly decreased. That is, the conventional kneading apparatus is not suitable for a kneading operation with high rubber filling percentage.

As is apparent from the above description, the apparatus of the invention ca knead rubber-like material with high efficiency without decreasing a quantity of rubber-like material which can be kneaded in each kneading operation.

What is claimed is:

1. A rubber-like material kneading apparatus comprising:

a case having a chamber cocoon-shaped in section; and a pair of rotors mounted in said chamber, each of said rotors comprising a shaft and three vanes arranged at equal angular intervals therearound and extending radially therefrom, each of said vanes defining a curved leading edge and a substantially straight trailing edge according to a direction of rotation of said shaft, one said curved leading edge and a succeeding said substantially straight trailing edge defining an area of turbulence therebetween in which kneading occurs, such that said vanes of different respective rotors are engaged with each other during rotation of said rotors, thereby to knead rubber-like material in said chamber;

each of said vanes comprising one long vane and one short vane, wherein each said long vane extends for at least one-half of the axial length of the respective shaft, each said long vane extending to a respective short vane three short vanes such that each of said vanes extends from one end to the other end of the shaft associated therewith, and such that a cutting angle formed by the trailing edges of said long vanes and the tangential line at an outer end, in a radial direction of, said long vanes is not similar than forty degrees but not larger than one hundred forty degrees.

2. An apparatus as claimed in claim 1, in which each of said long vanes is extended from one end of the respective rotor ear to the other end thereof, and form an angle of torsion of approximately forty-five degrees with a plane including the axis of rotation of said rotor.

* * * * *